United States Patent
Degwekar et al.

(10) Patent No.: US 9,992,282 B1
(45) Date of Patent: Jun. 5, 2018

(54) ENABLING HETEROGENEOUS STORAGE MANAGEMENT USING STORAGE FROM CLOUD COMPUTING PLATFORM

(71) Applicant: EMC Corporation

(72) Inventors: Anil Degwekar, Bangalore (IN); Parashuram Hallur, Bagalkot District (IN); Anoop George Ninan, Milford, MA (US); Puneet Lal, Shrewsbury, MA (US); Santhosh Lakshmanan, Namakkal (IN); Vasantha Gopal, Madurai (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 333 days.

(21) Appl. No.: 14/317,455

(22) Filed: Jun. 27, 2014

(51) Int. Cl.
*H04L 29/08* (2006.01)

(52) U.S. Cl.
CPC ................................. *H04L 67/1097* (2013.01)

(58) Field of Classification Search
CPC ............................ G06F 3/0604; G06F 3/0685
See application file for complete search history.

(56) References Cited

U.S. PATENT DOCUMENTS

| | | | |
|---|---|---|---|
| 7,885,276 B1* | 2/2011 | Lin ...................... | H04L 67/1002 370/401 |
| 2009/0276771 A1* | 11/2009 | Nickolov ............. | G06F 9/4856 717/177 |
| 2010/0299495 A1* | 11/2010 | Frank .................... | G06F 9/5011 711/170 |
| 2011/0246734 A1* | 10/2011 | Umbehocker ........ | G06F 3/0608 711/162 |
| 2012/0150925 A1* | 6/2012 | Gupta ................... | G06F 3/0605 707/822 |
| 2012/0254111 A1* | 10/2012 | Carmichael ....... | G06F 17/30094 707/627 |
| 2013/0007265 A1* | 1/2013 | Benedetti ............ | H04L 67/1097 709/224 |
| 2013/0018994 A1* | 1/2013 | Flavel ................ | H04L 41/0806 709/220 |
| 2014/0025816 A1* | 1/2014 | Otani .................... | G06F 9/5072 709/225 |
| 2014/0164684 A1* | 6/2014 | Rosenband ............. | G06F 3/061 711/103 |
| 2014/0181025 A1* | 6/2014 | Castro ............... | G06F 17/30215 707/634 |
| 2014/0380308 A1* | 12/2014 | Hassine ............. | G06F 9/45558 718/1 |
| 2015/0242204 A1* | 8/2015 | Hassine .................... | G06F 8/61 717/121 |
| 2015/0263894 A1* | 9/2015 | Kasturi ............... | H04L 41/0806 709/222 |
| 2015/0324217 A1* | 11/2015 | Shilmover .......... | G06F 9/45558 718/1 |
| 2015/0331635 A1* | 11/2015 | Ben-Shaul ............ | G06F 9/5061 711/120 |

* cited by examiner

*Primary Examiner* — Joe Chacko
(74) *Attorney, Agent, or Firm* — Daly, Crowley, Mofford & Durkee, LLP

(57) ABSTRACT

In one aspect, a method includes reading a configuration file to obtain settings of device drivers for a cloud computing storage array, enumerating a backend driver as the cloud computing storage array in a data storage system, instantiating a default port for the cloud computing storage array and accessing the cloud computing storage array using the data storage system.

20 Claims, 9 Drawing Sheets

ENABLING HETEROGENEOUS STORAGE MANAGEMENT USING STORAGE FROM CLOUD COMPUTING PLATFORM

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes reading a configuration file to obtain settings of device drivers for a cloud computing storage array, enumerating a backend driver as the cloud computing storage array in a data storage system, instantiating a default port for the cloud computing storage array and accessing the cloud computing storage array using the data storage system.

In another aspect, an apparatus includes electronic hardware circuitry configured to read a configuration file to obtain settings of device drivers for a cloud computing storage array, enumerate a backend driver as the cloud computing storage array in a data storage system, instantiate a default port for the cloud computing storage array and access the cloud computing storage array using the data storage system.

In a further aspect, an article includes a non-transitory computer-readable medium that stores computer-executable instructions. The instructions cause a machine to read a configuration file to obtain settings of device drivers for a cloud computing storage array, enumerate a backend driver as the cloud computing storage array in a data storage system, instantiate a default port for the cloud computing storage array and access the cloud computing storage array using the data storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

Figure 1:
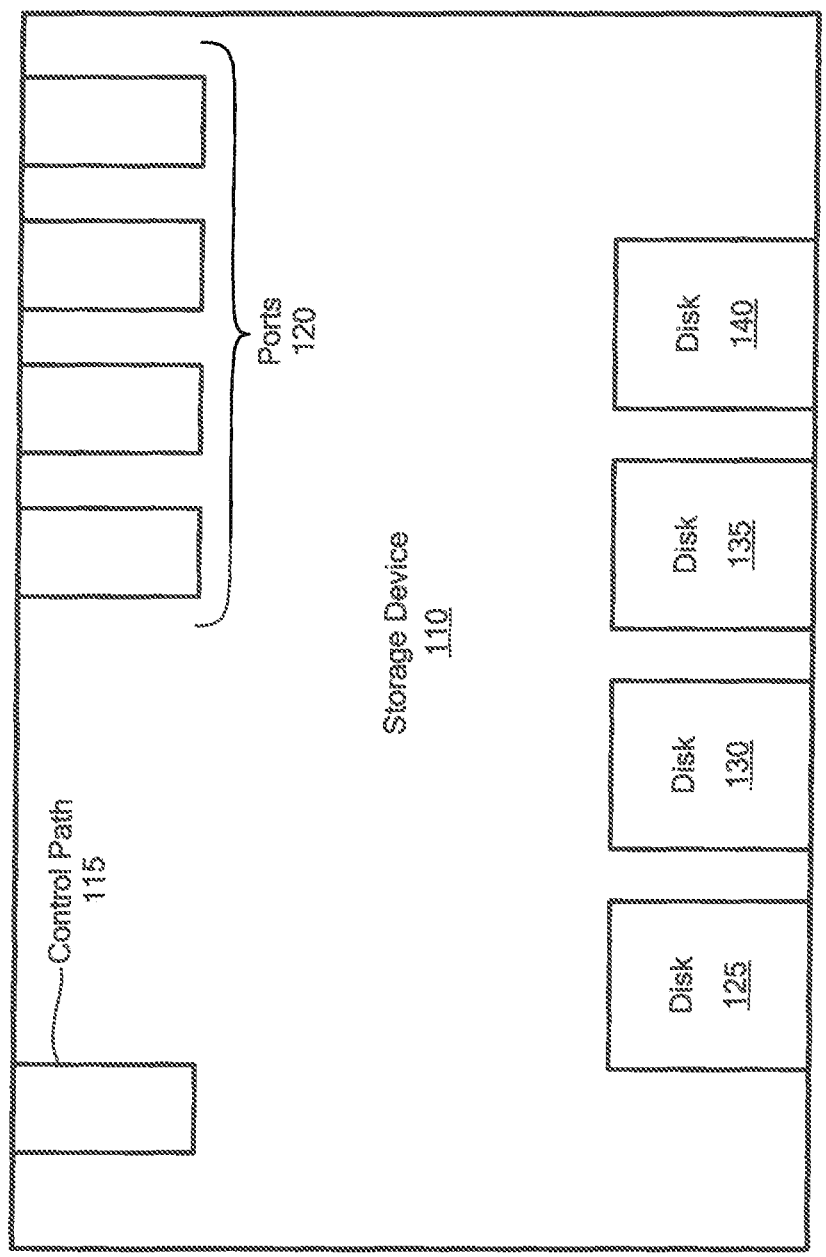
FIG. 1 is a simplified block diagram of an example of a data storage device.

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMWARE® and OPENSTACK®.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be generated in the system for the purposes of security isolation.

A neighborhood may represent a fault domain within a network. In many embodiments, a plurality of data centers may be combined to generate a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains. A neighborhood may also be referred to as a 'virtual array'.

A transport zone may represent a region of connectivity within a neighborhood. In many embodiments, a transport zone may include a network, such as a SAN network or an IP network. In various embodiments, a transport zone may include addresses (such as a World Wide Names (WWN) that may be in the network for both hosts and storage array ports. In some embodiments, addresses for hosts may include initiator addresses and/or IP addresses. In certain embodiments, a data storage system may be enabled to determine what initiators may be connected to what storage ports by analyzing a transport zone.

An initiator may be an address used in the SAN networking. In many embodiments, an initiator may include a Fiber Channel (FC) initiator and/or an iSCSI initiator. In various embodiments, FC initiators may use a WWN address as a unique identifier in a data storage system. In various embodiments, a WWN may include a port address and/or node address. In certain embodiments, an iSCSI initiator may include addresses of type IQN and EUI. An engine may be a hardware unit within a Symmetrix Array. In various embodiments, a VMAX system may include eight engines, where each engine may include two directors.

A director may be a hardware unit within a Symnietrix Array, on an engine. In some embodiments, each director may include one or more ports.

A project may be a resource organization abstraction that maps resources to applications, virtual data centers, departments, or other entities. In some embodiments, a user may generate their own projects, and may associate multiple resources from different data services with the projects. In most embodiments, resources from one project maybe shared between users under the same tenant.

A Class of Service may represent high-level capabilities and services that may be generated by administrators through composition of resource attributes and quality of services, including level of protection, availability, access protocol, performance, and additional storage/data services, such as versioning/snap, backup, remote replication, data reduction, encryption, and/or other data storage services. In many embodiments, users or tenants may select from a menu of Class of Service entries when generating a volume. A class of service may also be referred as a 'virtual storage pool'.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Referring to FIG. 1 a storage device 110 includes a control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

In many embodiments, the current disclosure may enable allocation of storage ports for exporting volumes from storage arrays in a data storage system. In various embodiments, the current disclosure may eliminate the need for an administrator to manually allocate each storage port. In some embodiments, the current disclosure may maximize hardware redundancy between selected allocated paths by applying prioritized filtering of the candidate ports based on their hardware redundancy information. In certain embodiments, an arbitrary number of filters may be applied according to importance. For example, in an embodiment, a higher importance filter may be applied before a lower importance filter. In many embodiments, the current disclosure may enable automatic allocation of storage ports in one or more configurations. In various embodiments, the current disclosure may enable balanced usage and/or allocation of ports from a data storage array.

In many embodiments, the current disclosure may enable optimized port selection for maximum redundancy which may consider both the data storage system, which may include the data storage array and the SAN fabric. In various embodiments, the current disclosure may enable load balancing across one or more data storage ports within a data storage system. In certain embodiments, the current disclosure may enable a user or administrator to dedicate one or more data storage ports for specific uses, such as a specified export group or project.

In various embodiments, a data storage system may include one or more internal constructs and hardware to facilitate giving access to one or more volumes to one or more hosts. In certain embodiments, the one or more internal constructs and hardware may include switches, SAN switches, initiators, directors, engines, and/or storage ports. In many embodiments, a data storage system may include one or more data storage arrays which may be enabled to connect to one or more hosts. In some embodiments, one or more data volumes maybe allocated from one or more data storage arrays for one or more hosts. In other embodiments, a host may have one or more initiators having one or more ports enabled to connect a data storage volume. In many embodiments, a host initiator port may connect to a switch which may enable communication with a data storage volume on a data storage array in a data storage system. In various embodiments, each data storage array may enable access to a data storage volume through one or more ports. In some embodiments, a data storage array may include one or more engines, wherein each engine may include one or more directors. In certain embodiments, each director may include one or more ports which may enable access to one or more data volumes on a data storage array within a data storage system. In other embodiments, a data storage system may use other constructs and hardware to facilitate communication with data volumes within a data storage system.

In many embodiments, administrative data may include storage port registration status. In various embodiments, storage port registration status may specify which storage ports may be used by the data storage system. In certain embodiments, administrative data may include whether zoning may be enabled. In some embodiment, a data storage system may include one or more neighborhoods. In other embodiments, the current disclosure may enable a data storage system to automatically generate connectivity when storage volumes are exported or exposed for consumption. In certain embodiments, automatic zoning of the SAN fabric, i.e. network connectivity of certain components, when storage volumes are exported within a neighborhood may be performed.

In many embodiments, each volume within a data storage system may identify and/or reside within a neighborhood in the data storage system. In various embodiments, a neighborhood may define a data center boundary within a data storage system. In certain embodiments, each transport zone may be contained within a specific neighborhood in a data storage system.

In other embodiments, each transport zone that may be used may identify a candidate set of storage ports and initiators within each respective transport zone that may be used together. In certain embodiments, a data storage system may determine a candidate set of storage ports based on storage ports that a system administrator registered in a given transport zone. In various embodiments, one or more data storage volumes may be connected to one or more hosts where the host initiators are in the same transport zone as the storage ports associated with the one or more data storage volumes. In various embodiments, a port provisioning system may use a candidate set of storage ports to export one or more data storage volumes to a host through a specified transport zone. In some embodiments, a host may be enabled to communicate with multiple transport zones, for example a host may have a first initiator in a first transport zone and a second initiator in a second transport zone. In various embodiments, a host may be enabled to communicate through two or more transport zones which may enable hardware redundancy when generating data paths from the host to the one or more data storage volumes.

In many embodiments, system data may include information on switch and communication availability between each host and data volumes allocated for each host. In some embodiments, system data may include each switch a host may be connected to. In certain embodiments, each host initiator may identify a SAN switch that is directly connected to the host. In other embodiments, system data may include each switch a storage port on a storage array may be connected to. In various embodiments, each candidate storage port may identify a switch that is directly connected to a storage port on a storage array. In many embodiments, system data may include information pertaining to initiator-target communication ability. In various embodiments, the existence of an initiator name and a target name in the same network or a network's database entries may indicate that the initiator and target may be able to communicate with each other.

Figure 2:
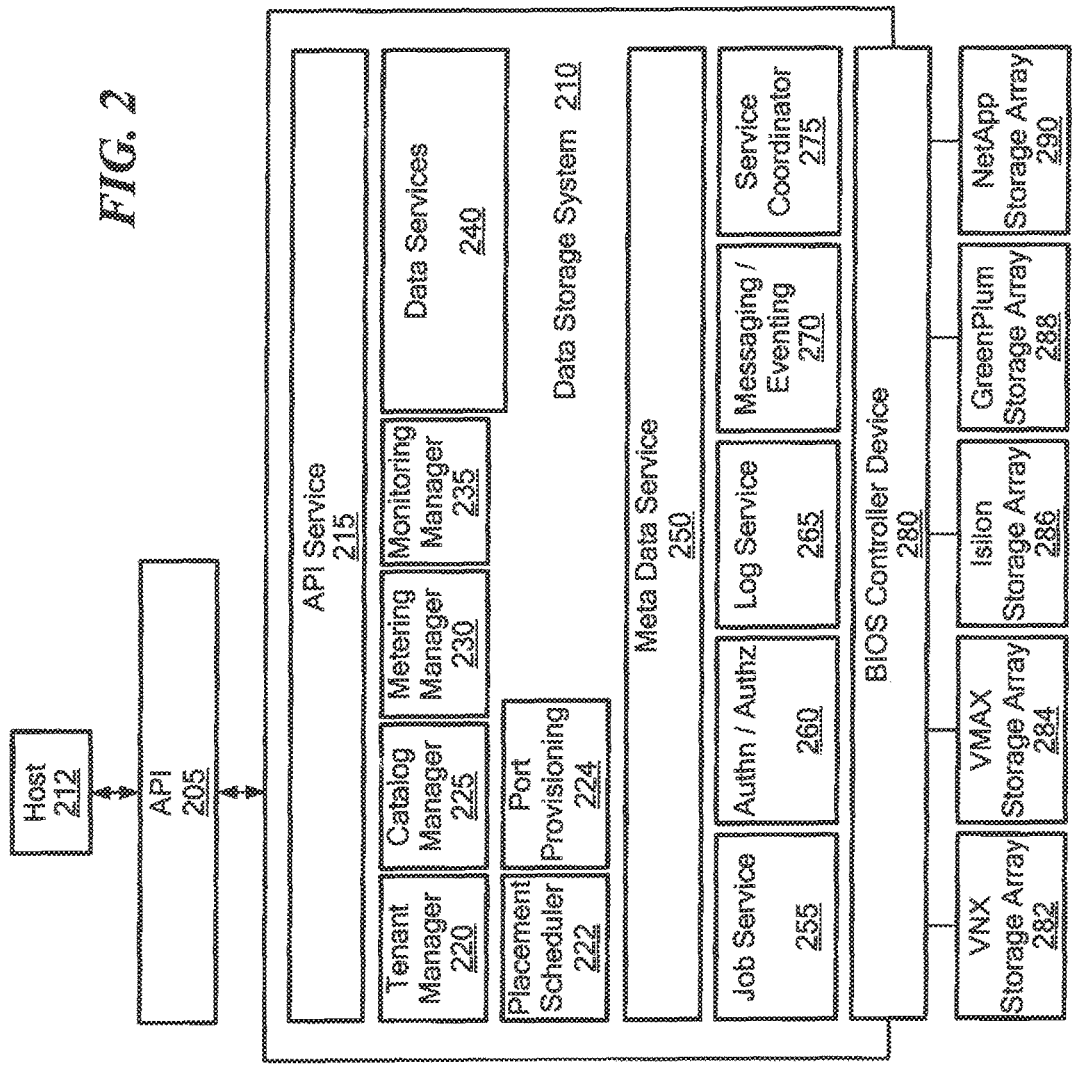
FIG. 2 is a simplified block diagram of an example of a data storage system.

Referring to FIG. 2, API Service 215 enables external access to Host 212 through API 205. API Service 215 communicates requests to one big array, data storage system 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/authz 260, log service 265, messaging/eventing 270, port provisioning 224, placement scheduler 222, and BIOS Controller Device 280. As shown, port provisioning 224 allocates data storage ports from data storage volumes allocated from attached data storage. In this embodiment, attached data storage includes VNX storage array 282, VMAX storage array 284, Isilon storage array 286, GreenPlum storage array 288, and NetApp storage array 290.

At times data storage system 210 may need to work with arrays for which it does not possess drivers. For example, there may be another storage management solution which has those drivers. The need is then for data storage system 210 to use the drivers contained in another storage management solution. Described herein are storage management solutions that work with heterogeneous storage (i.e., storage from different vendors).

A data center can have a collection of heterogeneous storage arrays. In one particular example, some arrays may be managed by a cloud computing environment, while others may be managed by the data storage system 210. The data storage system 210 will treat a cloud computing platform as a provider of storage arrays so that the data storage system 210 can use arrays managed by cloud computing platform even when it has no internal knowledge (or drivers) for them. As will be shown further herein, data storage system 210 constructs storage arrays out of the configured storage backends in the cloud computing platform. Each configured backend in the cloud computing platform is treated as a storage array. This solution constructs storage pools out of the configured volume types in the cloud computing platform and each configured volume type in the cloud computing platform is treated as a storage pool.

The relationship between the storage pools and storage arrays is constructed based on the association between the volume type and configured backend in cloud computing platform. A picture of storage arrays and storage pools is thus constructed out of a configured storage in cloud computing platform. This enables data storage system 210 to manage them as regular arrays. All management constructs (e.g., virtual storage pool, virtual arrays, projects, tenants, and so on) are thus able to be applied to a cloud computing environment which doesn't support these constructs. This solution allows easy integration of arrays which are being managed by one storage management solution into another storage management solution.

While adding cloud computing storage is described herein, one of ordinary skill in the art would recognize that other storage environments may be added to the data storage 210.

Figure 3:
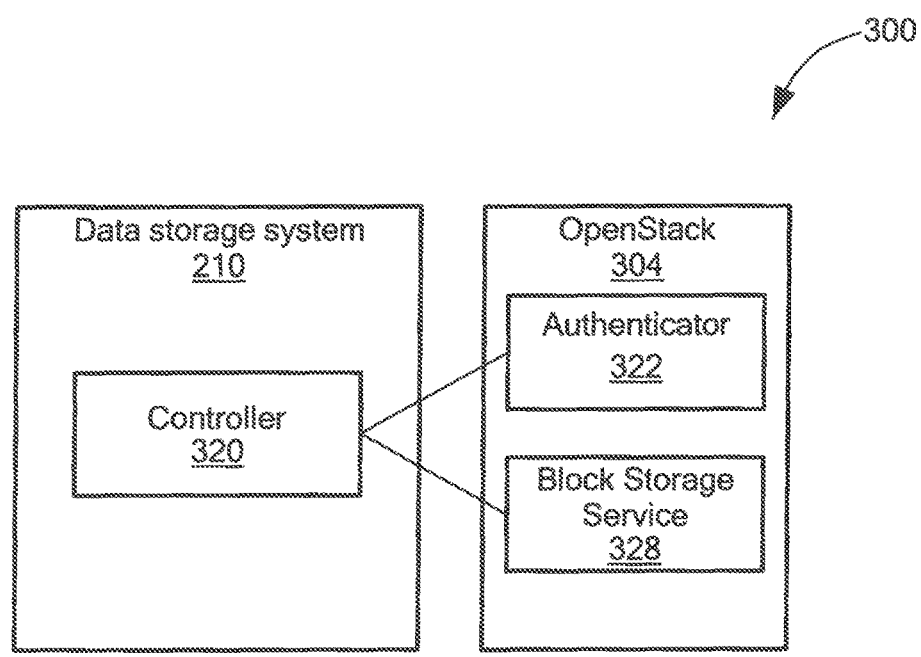
FIG. 3 is a simplified block diagram of an example of a heterogeneous storage system.

Referring to FIG. 3, a heterogeneous storage system 300 includes the data storage system 210, which includes a controller 320; and a cloud computing storage system 304, which includes an authenticator (e.g., Keystone) and a block storage service 328 (e.g., Cinder). In one operation, an authenticate signal is sent from the data storage system 210 to the authenticator 322. The authenticator 322 returns an authenticated token to the data storage system 210. Using the authenticated token receives, data storage system 210 invokes REST API calls to the block storage service 328 to get the required information to enumerate storage systems and storage pools in the storage system 210.

Figure 4:
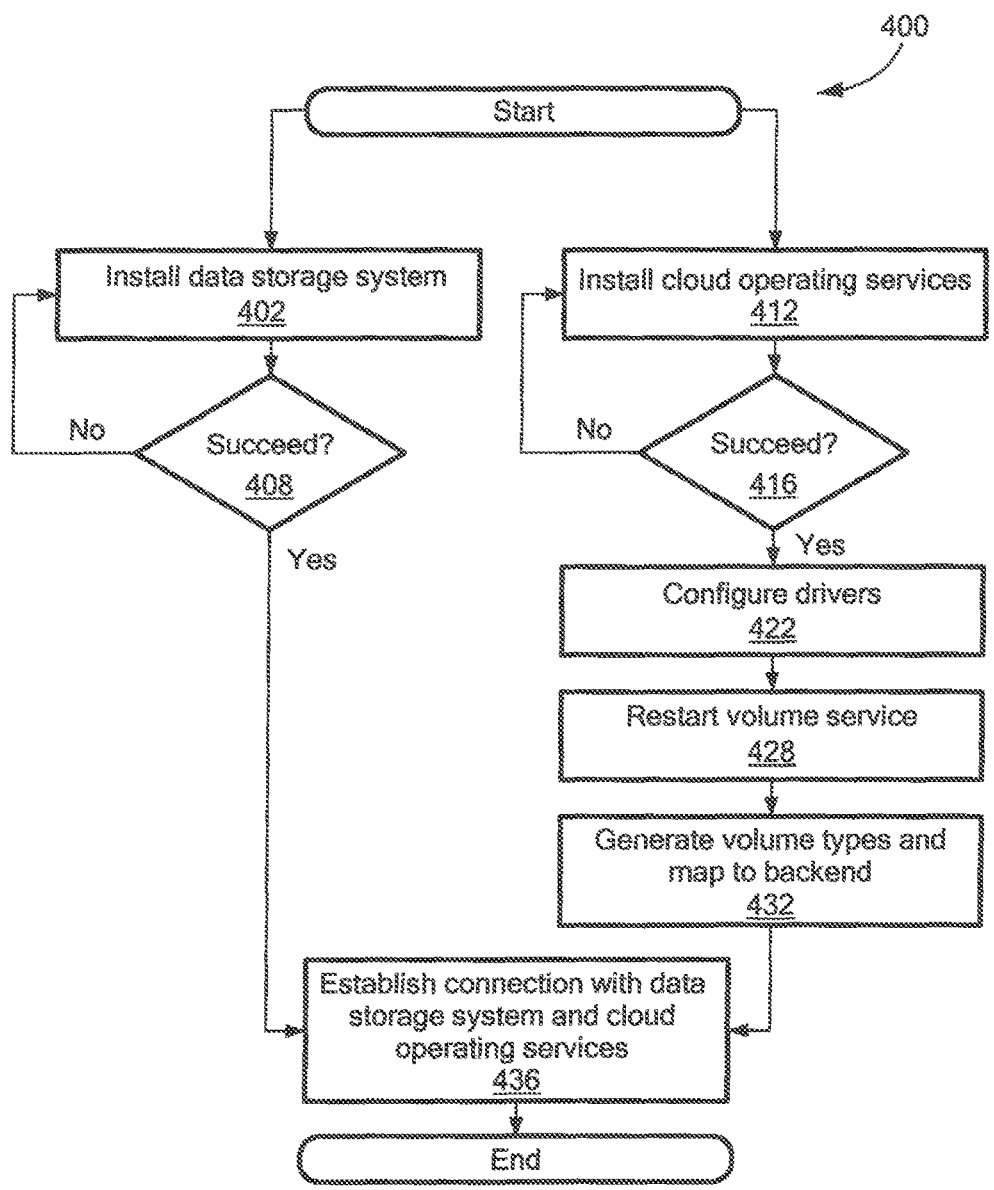
FIG. 4 is a simplified flowchart of an example of a process to setup the heterogeneous storage system.

Referring to FIG. 4, an example of a process to setup the system 300 is a process 400 performed by the controller 320. Process 400 install data storage system (402). For example, the data storage system 210 is installed. Process 400 determines if the install of the data storage system succeeded (408) and if not successful process 400 continues to repeat processing block 402.

Process 400 installs open stack services (412). Process 400 determines if the install of the open stack services succeeded (408) and if not successful process 400 continues to repeat processing block 412. If successful, process 400 configures drivers (422). In one example, the Open Stack drivers are configured by modifying a cloud computing configuration file so that for every array that needs to be managed through cloud computing, the settings for the array are added to the cloud computing configuration file. In another example, processing block 422 may also involve defining a volume type for each array, and associating the backend name with the volume type using the 'extra-specs' mechanism of OPENSTACK® Cinder.

Process 400 restarts volume service (428) and generates volume types and maps to backend (432). For example, the volume types are generated and a patch to the cloud computing storage is mapped. Process 400 establishes a connection between the data storage system 210 and the Cloud computing 304 (436). In this connection, the cloud computing 304 is configured as a 'storage provider' in data storage system 210. There can be a plurality of such storage providers which can be attached to the data storage system 210.

Figure 5:
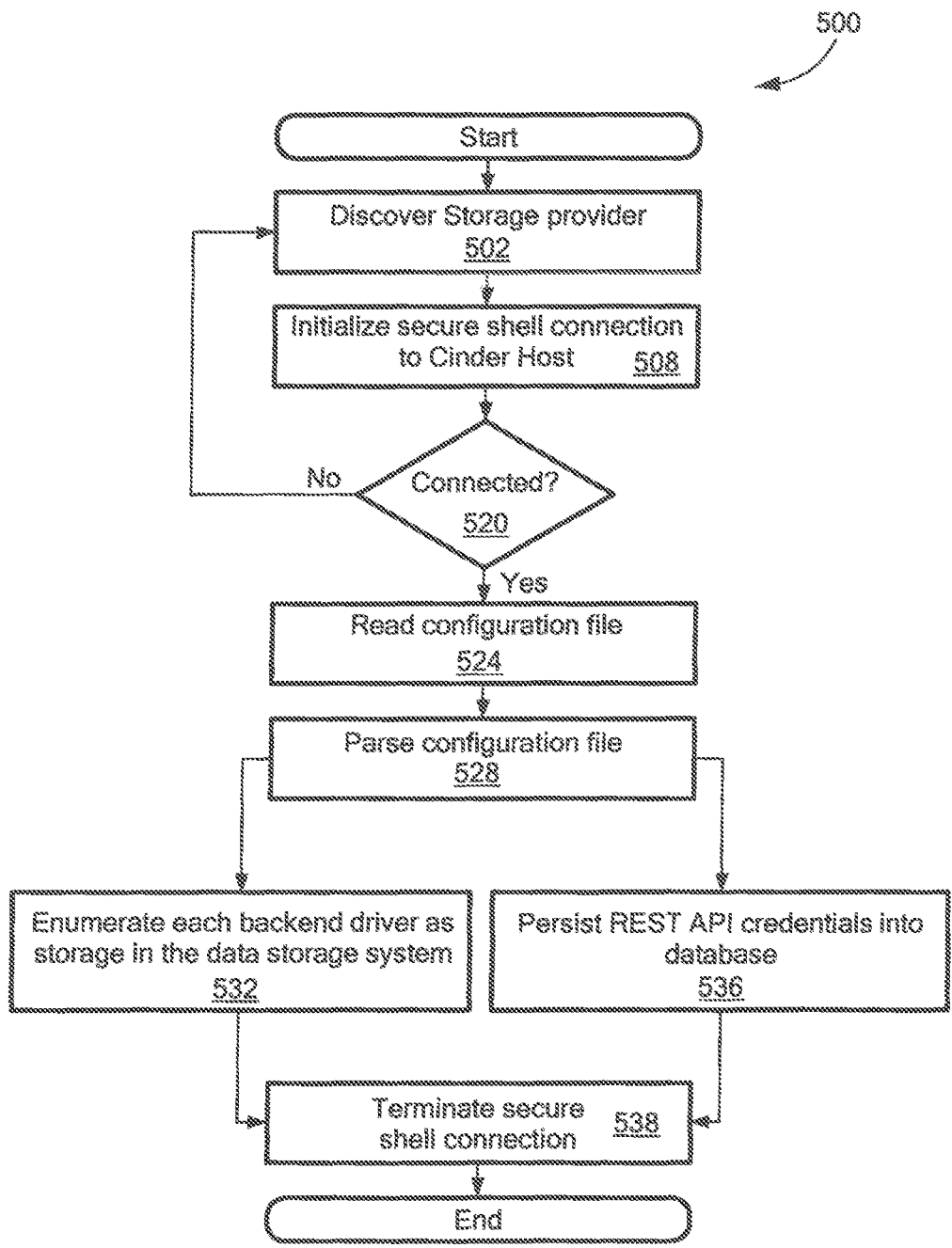
FIG. 5 is a simplified flowchart of an example of a process to scan a storage provider to add storage from cloud computing platform to the data storage system.

Referring to FIG. 5, an example is provided of a process to scan a storage provider to add storage from cloud computing platform to the data storage system is a process 500 performed by the controller 320. Process 500 discovers the storage provider (502) and initializes a secure shell connection to the Open Stack host (508).

Process 500 determines if there is a connection (520). If there is not a connection, process 500 repeats processing blocks 502 and 508. If there is a connection, process 500 reads the cloud computing configuration file (524). For example, the cloud computing configuration file is read using an FTP protocol.

Process 500 parses the cloud computing configuration file (528). For example, the cloud computing configuration file is parsed to get the REST API credentials and backend driver settings. In one example, the parsing is performed line by line.

Process 500 enumerates each backend driver as cloud computing storage array in the storage system 210 (532) and persists REST API credentials into the database (536). Process 500 terminates secure shell connection (538).

Figure 6:
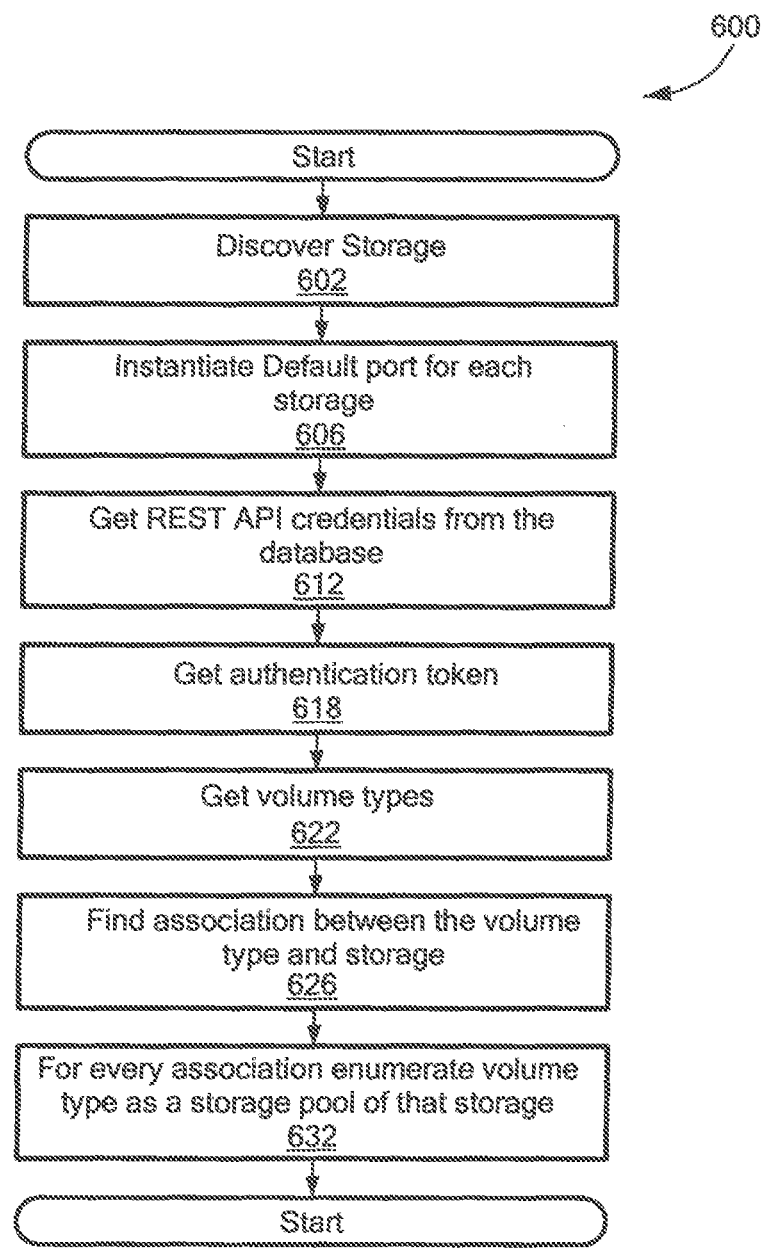
FIG. 6 is a simplified flowchart of an example of a process to discover storage pools.

Referring to FIG. 6, an example of a process to discover storage pools is a process 600 performed by the controller 320. Process 600 discovers storage (602) and instantiates a default port (606). For example, process 600 discovers the cloud computing storage systems (e.g., cinder) and instantiates a default port for each cloud computing storage array configured previously in processing block 532. In one particular example, instantiation may be performed by generating an iSCSI port by default. If "iscsi" is in the storage name, found in the configuration file (in processing block 524), generate an iSCSI port. If "fc" is in the storage name found in the configuration file, then generate an FC port. If "nfs" is in the storage name found in the configuration file, then discard that port.

Process 600 gets REST API credentials from the database (612), gets authentication token (618) and gets volume types (622). Process 600 finds association between the volume type and the cloud computing storage (626) and, for every association, process 600 enumerates volume type as a storage pool of that storage (636). In one example, an association is found based on the volume backend name of driver set on the volume type. This association is found based on the 'extra-specs' of each volume type of cinder in processing block 422.

Figure 7A:
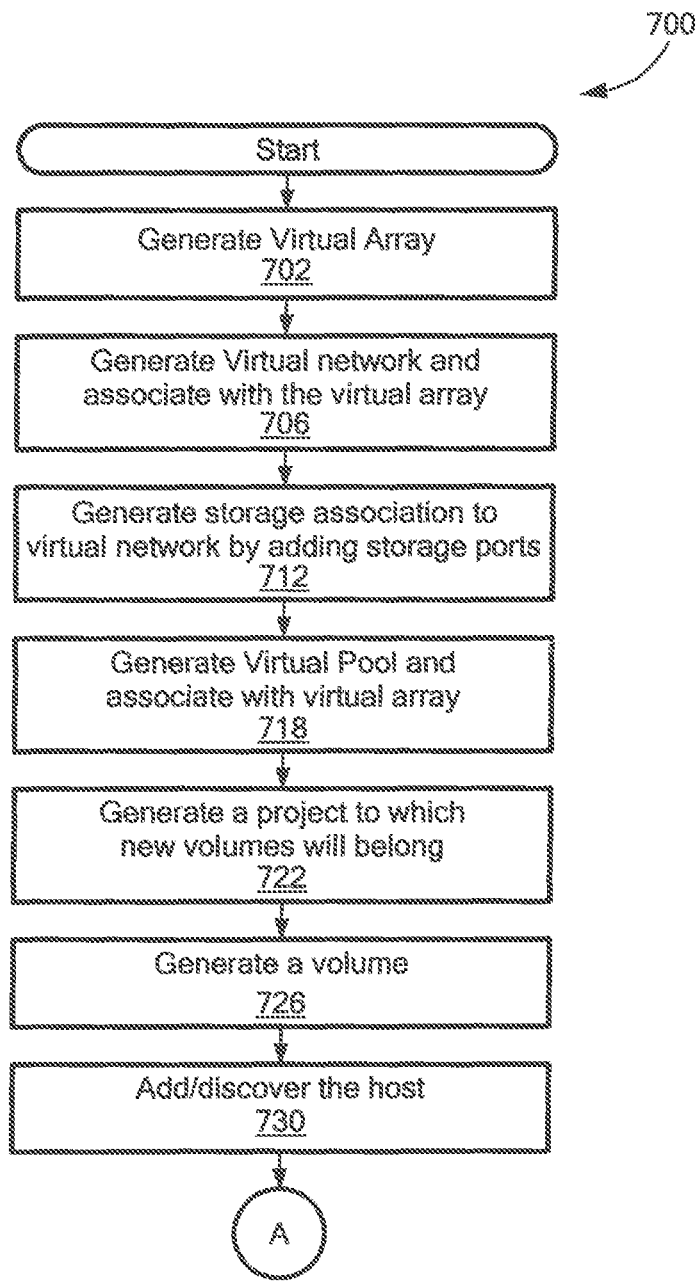
FIGS. 7A and 7B are a simplified flowchart of an example of a process to provision a volume to a host.
Figure 7B:
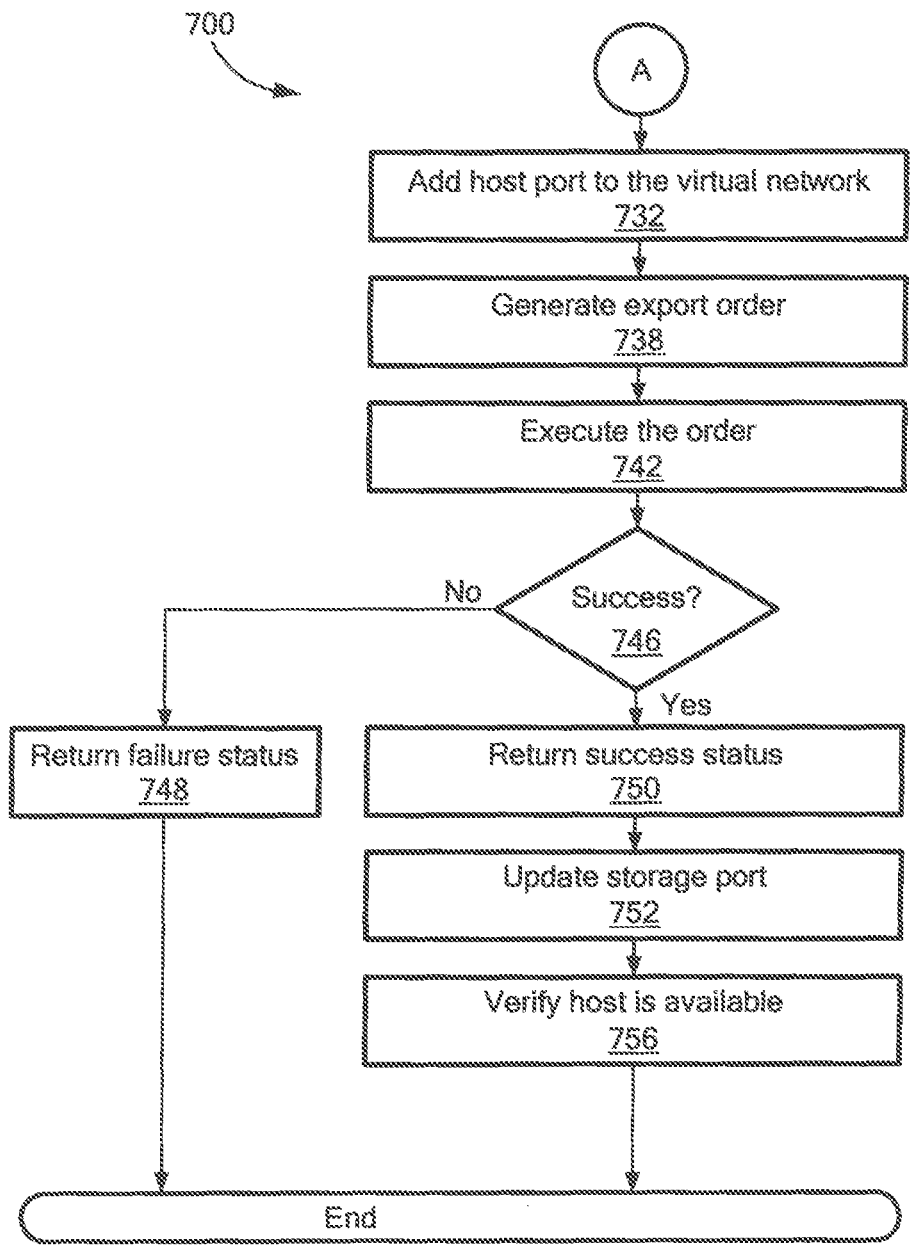

Referring to FIGS. 7A and 7B, an example of a process to provision a volume to a host is a process 700 performed by the controller 320. Process 700 generates a virtual array (702) and generates a virtual network associated with the virtual array (706). For example, an iSCSI virtual network is generated for iSCSI protocol and FC network is generated for FC protocol. The iSCSI or FC network may also be discovered from a SAN fabric controller.

Process 700 generates storage association to virtual network by adding storage ports (712). For example, FC ports are added to an FC network and iSCSI ports are added to IP network.

Process 700 generates virtual pool and associates the virtual pool with the virtual array (718). For example, policies of a virtual pool decide the physical storage pool association to the virtual array.

Process 700 generates a project to which new volumes belong (722), generates a volume (726), adds or discovers the host (730) and adds host port to the virtual network (732). Process 700 generates export order (738) and executes the order (742). For example, order execution occurs by mapping storage pool to volume type on the cloud computing.

Process 700 determines if the execution of the order is a success (746). If it is not a success, process 700 returns a status indicating failure (748) and process 700 ends.

If it is a success, process 700 returns status indicating a success along with target/target port details (750), updates storage port with actual port ID or World-Wide Names (WWN) (752) and verifies host is available by logging into the host, for example (756). In one example, it is possible that every port will return new port information. In such cases, new instances of the storage port are enumerated in order to deduce actual ports of the cloud computing storage.

Figure 8:
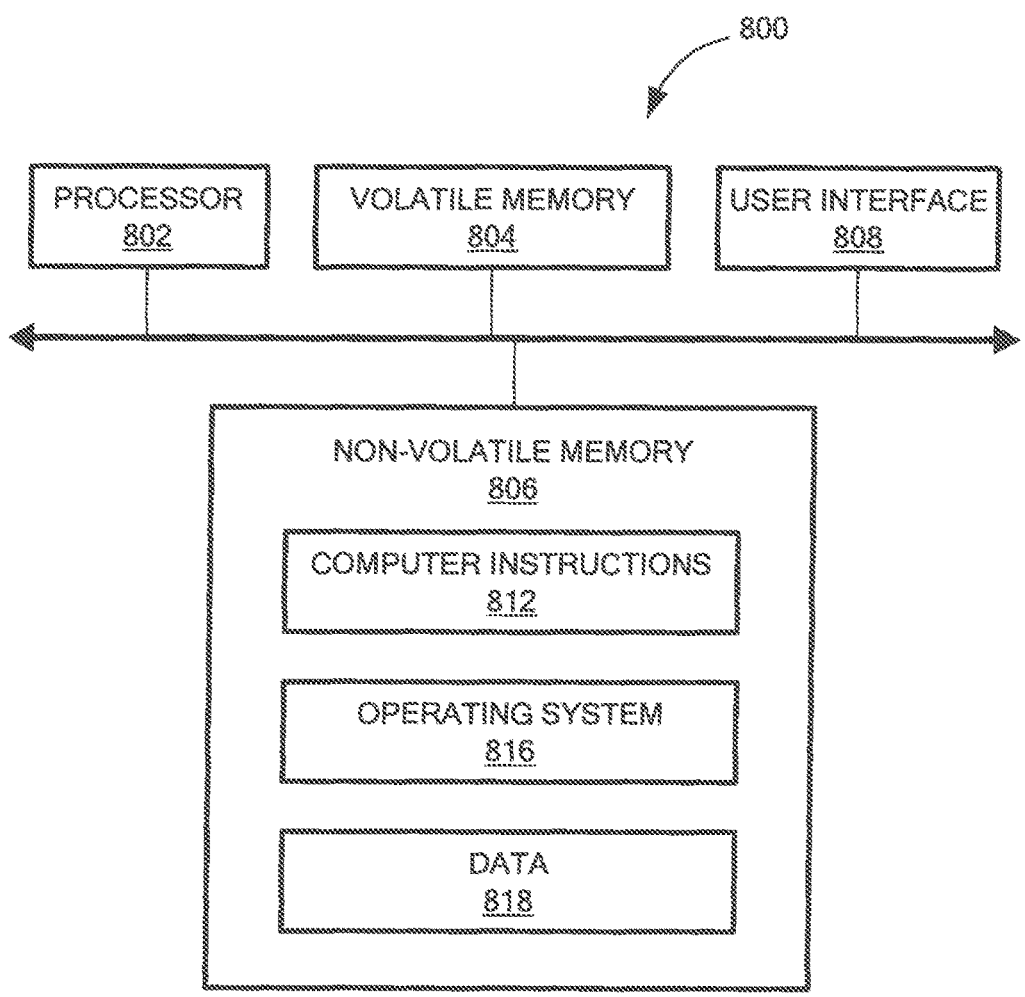
FIG. 8 is a simplified block diagram of an example of a computer on which any of the processes of FIGS. 4 to 7B may be implemented.

Referring to FIG. 8, a computer includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes 400, 500, 600 and 700).

The processes described herein (e.g., processes 400, 500, 600 and 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500, 600 and 700 are not limited to the specific processing order of FIGS. 4 to 7B, respectively. Rather, any of the processing blocks of FIGS. 4 to 7B may be re-ordered, combined or removed, performed in parallel or in serial, as necessary, to achieve the results set forth above.

The processing blocks (for example, in the processes 400, 500, 600 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Elements of different embodiments described herein may be combined to form other embodiments not specifically set forth above. Other embodiments not specifically described herein are also within the scope of the following claims.

What is claimed is:

1. A method comprising:
   configuring a data storage system to comprise a plurality of storage arrays;
   reading a configuration file to obtain backend device drivers and credentials for a plurality of cloud computing storage arrays to be included in the data storage system, wherein drivers for each of the plurality of cloud computing storage arrays are external to the data storage system, wherein the data storage system supports a set of management constructs, and wherein each of the plurality of cloud computing storage arrays supports less than all of the set of management constructs;
   enumerating each backend driver as a corresponding one cloud computing storage array of the plurality of cloud storage arrays in the data storage system;
   enumerating volume types as storage pools of the plurality of cloud computing storage arrays for associations between the volume types and the plurality of cloud computing storage arrays, wherein enumerating the volume types further comprises:
      defining a respective volume type for each of the plurality of cloud computing storage arrays for which the drivers are external to the data storage system; and
      associating respective backend names of each respective cloud computing storage array with the respective volume types;
   persisting the credentials into a database;
   instantiating a default port for each cloud computing storage array;
   obtaining the credentials from the database;
   generating, within the data storage system, one or more management constructs selected from the group consisting of a virtual storage pool, a virtual array, a project, and a tenant;
   applying the one or more management constructs to the plurality of cloud computing storage arrays; and
   providing a host external access to each of the plurality of cloud computing storage arrays using the data storage system and the one or more management constructs.

2. The method of claim 1, wherein instantiating a default port comprises generating the default port based on the configuration file.

3. The method of claim 1, further comprising updating a storage port with at least one of an actual port ID or a world-wide name (WWN).

4. The method of claim 1, further comprising:
   generating a virtual array;
   generating a virtual network;
   associating the virtual array with the virtual network; and
   generating storage association to the virtual network.

5. The method of claims 4, further comprising:
   adding a host port to the virtual network; and
   generating an export order to add the cloud computing storage array as a target port.

6. The method of claim 1, further comprising configuring the data storage system to comprise a plurality of heterogeneous storage arrays.

7. The method of claim 6, further comprising managing the plurality of heterogeneous storage arrays as if the plurality of heterogeneous storage arrays comprised a single storage array.

8. An apparatus, comprising:
   electronic hardware circuitry configured to:
      configure a data storage system to comprise a plurality of storage arrays;
      read a configuration file to obtain backend device drivers and credentials for a plurality of cloud computing storage arrays to be included in the data storage system, wherein drivers for each of the plurality of cloud computing storage arrays are external to the data storage system, wherein the data storage system supports a set of management constructs, and wherein each of the plurality of cloud computing storage arrays supports less than all of the set of management constructs;

enumerate each backend driver as a corresponding one cloud computing storage array of the plurality of cloud storage arrays in the data storage system;

enumerate volume types as storage pools of the plurality of cloud computing storage arrays for associations between the volume types and the plurality of cloud computing storage arrays, wherein enumerating the volume types further comprises:

defining a respective volume type for each of the plurality of cloud computing storage arrays for which the drivers are external to the data storage system; and associating respective backend names of each respective cloud computing storage array with the respective volume types;

persist the credentials into a database;

instantiate a default port for each cloud computing storage array;

obtain the credentials from the database;

generate, within the data storage system, one or more management constructs selected from the group consisting of a virtual storage pool, a virtual array, a project, and a tenant;

apply the one or more management constructs to the plurality of cloud computing storage arrays; and provide a host external access to each of the plurality of cloud computing storage arrays using the data storage system and the one or more management constructs.

9. The apparatus of claim 8, wherein the circuitry comprises at least one of a processor, a memory, a programmable logic device or a logic gate.

10. The apparatus of claim 8, wherein the circuitry configured to instantiate a default port comprises circuitry configured to generate the default port based on the configuration file.

11. The apparatus of claim 8, further comprising circuitry configured to update a storage port with at least one of an actual port ID or a world-wide name (WWN).

12. The apparatus of claim 1, further comprising circuitry configured to:
generate a virtual array;
generate a virtual network;
associate the virtual array with the virtual network; and
generate storage association to the virtual network.

13. The apparatus of claim 12, further comprising circuitry configured to:
add a host port to the virtual network; and
generate an export order to add the cloud computing storage array as a target port.

14. The apparatus of claim 8, further comprising electronic hardware circuitry configured to configure the data storage system to comprise a plurality of heterogeneous storage arrays.

15. An article comprising:
a non-transitory computer-readable medium that stores computer-executable instructions, the instructions causing a machine to:
configure a data storage system to comprise a plurality of storage arrays;
read a configuration file to obtain backend device drivers and credentials for a plurality of cloud computing storage arrays to be included in the data storage system, wherein drivers for each of the plurality of cloud computing storage arrays are external to the data storage system, wherein the data storage system supports a set of management constructs, and wherein each of the plurality of cloud computing storage arrays supports less than all of the set of management constructs;

enumerate each backend driver as a corresponding one cloud computing storage array of the plurality of cloud storage arrays in the data storage system;

enumerate volume types as storage pools of the plurality of cloud computing storage arrays for associations between the volume types and the plurality of cloud computing storage arrays, wherein enumerating the volume types further comprises;

defining a respective volume type of each of the plurality of cloud computing storage arrays for which the drivers are external to the data storage system; and associating respective backend names of each respective cloud computing storage array with the respective volume types;

persist the credentials into a database;

instantiate a default port for each cloud computing storage array;

obtain the credentials from the database;

generate, within the data storage system, one or more management constructs selected from the group consisting of a virtual storage pool, a virtual array, a project, and a tenant;

apply the one or more management constructs to the cloud computing storage arrays; and provide a host external access to each of the plurality of cloud computing storage arrays using the data storage system and the one or more management constructs.

16. The article of claim 15, wherein the circuitry configured to instantiate a default port comprises circuitry configured to generate the default port based on the configuration file.

17. The article of claim 15 further comprising circuitry configured to update a storage port with at least one of an actual port ID or a world-wide name (WWN).

18. The article of claim 15, further comprising circuitry configured to:
generate a virtual array;
generate a virtual network;
associate the virtual array with the virtual network; and
generate storage association to the virtual network.

19. The article of claim 18, further comprising circuitry configured to:
add a host port to the virtual network; and generate an export order to add the cloud computing storage array as a target port.

20. The article of claim 15, further comprising computer-executable instructions that cause the machine to configure the data storage system to comprise a plurality of heterogeneous storage arrays.

* * * * *